United States Patent
Phelps et al.

(10) Patent No.: US 12,182,609 B1
(45) Date of Patent: Dec. 31, 2024

(54) SYSTEMS AND METHODS FOR MANAGING THE CONFIGURATION AND EXECUTION OF EXECUTABLE CONTROLS

(71) Applicant: United Services Automobile Association (USAA), San Antonio, TX (US)

(72) Inventors: David Anthony Phelps, San Antonio, TX (US); Marco Antonio Gracia, San Antonio, TX (US); Ryan Thomas McLeod, Lino Lakes, MN (US); Jacqueline Wendy Montemayor, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 226 days.

(21) Appl. No.: 17/828,570

(22) Filed: May 31, 2022

(51) Int. Cl.
    *H04L 9/32* (2006.01)
    *G06F 9/46* (2006.01)
    *H04L 9/00* (2022.01)

(52) U.S. Cl.
    CPC ............ *G06F 9/461* (2013.01); *H04L 9/3236* (2013.01); *H04L 9/50* (2022.05)

(58) Field of Classification Search
    CPC ........... G06F 9/461; G06F 9/3236; G06F 9/50
    See application file for complete search history.

(56) References Cited

U.S. PATENT DOCUMENTS

| | | | |
|---|---|---|---|
| 2010/0186010 A1* | 7/2010 | Chalemin | G06F 9/5077 718/1 |
| 2014/0310401 A1* | 10/2014 | Thomas | H04L 47/70 709/224 |
| 2015/0238692 A1* | 8/2015 | Peterson | A61N 1/046 604/503 |
| 2016/0277249 A1* | 9/2016 | Singh | H04L 41/5025 |
| 2021/0241149 A1* | 8/2021 | Carlson | G06N 5/043 |
| 2022/0050449 A1* | 2/2022 | Brett | G05B 15/02 |
| 2023/0267069 A1* | 8/2023 | Jeyarajaboopathy | G06F 11/3636 717/128 |

OTHER PUBLICATIONS

Artificial intelligence and multi agent based distributed ledger system for better privacy and security of electronic healthcare records, by Alruwaili, published 2020. (Year: 2020).*

* cited by examiner

*Primary Examiner* — Vu V Tran
(74) *Attorney, Agent, or Firm* — Fletcher Yoder P.C.

(57) ABSTRACT

Embodiments of the present disclosure include systems and methods for managing the configuration and execution of executable controls. In particular, a control execution management system may enable organizations to configure executable controls relating to certain internal and/or external processes, and for configuration and execution data for the executable controls to be maintained by the organizations, for example, in a distributed ledger (e.g., a blockchain network). Continuously monitoring configuration and execution data of the executable controls may enable an organization to always have updated information relating to the executable controls and how they impact their associated internal and/or external processes, thereby enabling the organization to, for example, provide such information to regulatory agencies, relevant stakeholders, and so forth.

19 Claims, 8 Drawing Sheets

SYSTEMS AND METHODS FOR MANAGING THE CONFIGURATION AND EXECUTION OF EXECUTABLE CONTROLS

TECHNICAL FIELD

The present disclosure relates generally to systems and methods for managing the configuration and execution of executable controls.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Various organizations have myriad internal and external processes that define the activity of those organizations. For example, certain companies provide services and/or products to their customers, which require many different types of internal and external processes. However, these processes often need to have associated executable controls, which can be utilized by the processes to ensure that certain internal and/or external rules are adhered to by the processes. When such executable controls are used, it would be desirable to have relatively easy access to information relating to the configuration and/or execution of such executable controls. Unfortunately, such information is conventionally not stored in a centralized location, if it even is stored at all.

BRIEF DESCRIPTION

Certain embodiments of the present disclosure include a control execution management network that includes one or more computing devices comprising one or more processors configured to execute instructions stored in memory of the one or more computing devices. The instructions, when executed by the one or more processors, are configured to cause the one or more computing devices to: continuously monitor one or more processes being performed by one or more user computing devices communicatively connected to a communication network maintained by an organization to detect data relating to configuration and/or execution of one or more executable controls being utilized by the one or more processes. The one or more executable controls are configured to provide one or more rules for performance of one or more functions of the one or more processes. The instructions, when executed by the one or more processors, are also configured to automatically store the detected data relating to the configuration and/or the execution of the one or more executable controls in a distributed ledger.

Certain embodiments of the present disclosure also include a method that includes continuously monitoring, via a control execution management system, one or more processes being performed by one or more user computing devices communicatively connected to a communication network maintained by an organization to detect data relating to configuration and/or execution of one or more executable controls being utilized by the one or more processes. The one or more executable controls are configured to provide one or more rules for performance of one or more functions of the one or more processes. The method also includes automatically storing, via the control execution management system, the detected data relating to the configuration and/or the execution of the one or more executable controls in a distributed ledger.

Certain embodiments of the present disclosure also include a control execution management system that includes one or more artificial intelligence (AI) bots configured to continuously monitor one or more processes being performed by one or more user computing devices communicatively connected to a communication network to detect data relating to configuration and/or execution of one or more executable controls being utilized by the one or more processes. The one or more executable controls are configured to provide one or more rules for performance of one or more functions of the one or more processes. The one or more AI bots are also configured to automatically communicate the detected data relating to the configuration and/or the execution of the one or more executable controls to one or more computing devices communicatively connected to the communication network. The control execution management system also includes the one or more computing devices configured to receive the detected data relating to the configuration and/or the execution of the one or more executable controls from the one or more AI bots. The one or more computing devices are also configured to automatically store the detected data relating to the configuration and/or the execution of the one or more executable controls in a distributed ledger.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
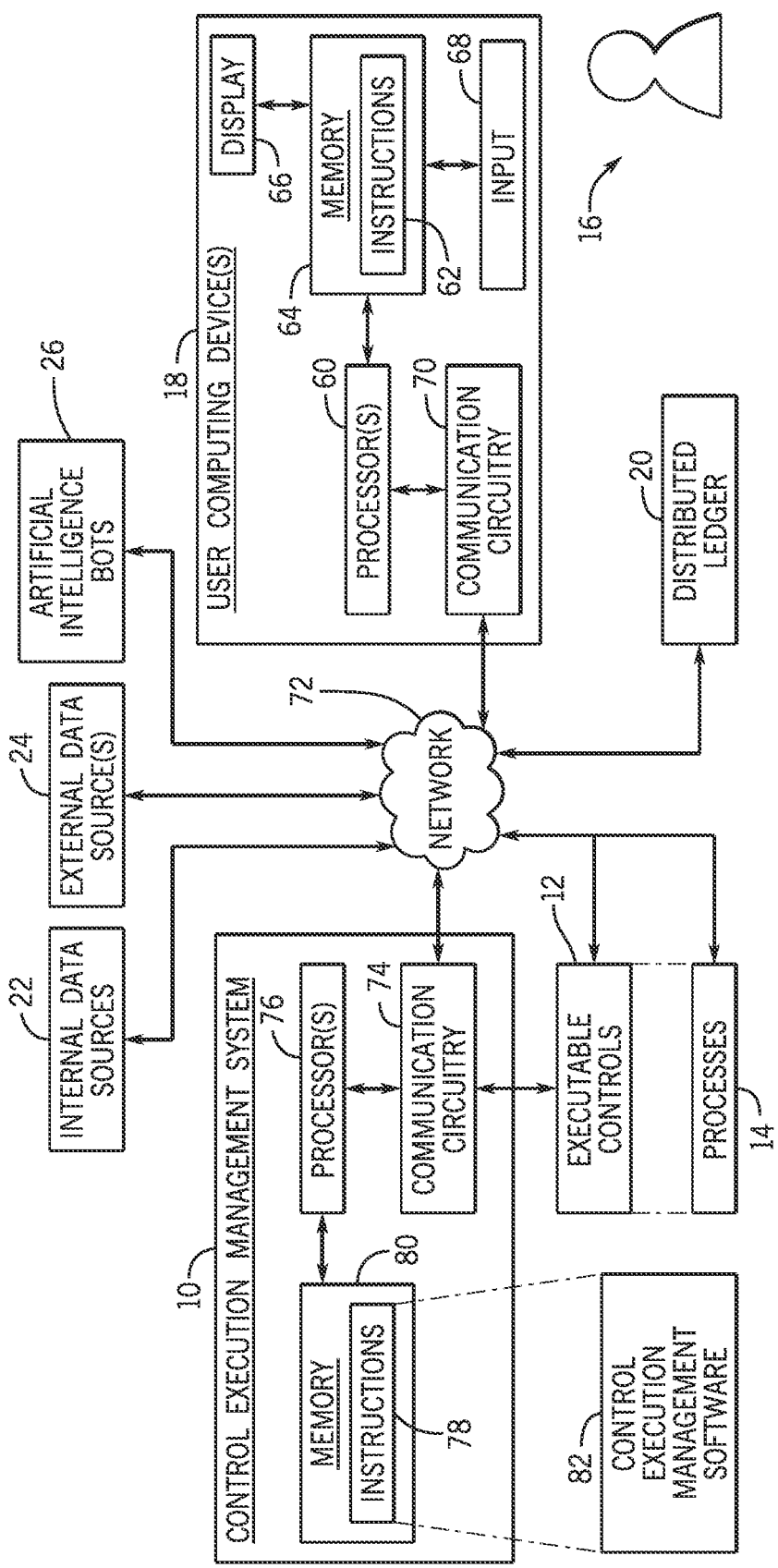
FIG. 1 is a schematic diagram of a control execution management system for managing the configuration and execution of executable controls that are executed as part of processes carried out by a particular organization, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the term "process" may refer to a software application that may be executed by a computing device or computing system (e.g., of one or more computing devices) to enable a user of the process to perform certain tasks. In addition, as used herein, the term "executable control" may refer to processing rules (e.g., parameters, parameter minimum values, parameter maximum values, and so forth), relatively small snippets of processing code, and so forth, which may be executable by associated processes.

As used herein, terms "continuous" and "continuously" may refer to ongoing (e.g., iterative) actions that are performed without interruption or are performed with interruptions that take no longer than a relatively short period of time, such as no longer than a 5-second interruption between the ongoing actions, no longer than a 1-second interruption between the ongoing actions, and so forth. For example, continuous ongoing actions may be performed in an iterative manner such that there is no appreciable (e.g., human-perceivable) interruption of the iterative actions.

As used herein, the terms "automatic" and "automatically" may refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions. Indeed, it will be appreciated that the computing devices or systems described herein may be configured to perform any and all of the functions described herein automatically.

As used herein, the term "cloud-based" may refer to functionality that is performed by a plurality of decentralized computing resources (e.g., computing devices) that function collectively, and that are accessible via the Internet as a collective group of computing resources. For example, a cloud-based computing system may provide computing functionality to users regardless of whether any particular computing resource is available. Rather, even when certain computing resources are replaced by other computing resources, the collective group of computing resources still provide computing functionality to users. In addition, a cloud-based computing system comprised of a plurality of computing resources may provide computing functionality to users even when Internet access to any particular computing resource is unavailable. Accordingly, cloud-based computing systems tend to provide enhanced availability through inherent redundancy of computing resources.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

The embodiments described herein include systems and methods for managing the configuration and execution of executable controls. In particular, a control execution management system may enable organizations to configure executable controls relating to certain internal and/or external processes, and for configuration and execution data for the executable controls to be maintained by the organizations, for example, in a distributed ledger (e.g., a blockchain network). Continuously monitoring configuration and execution data of the executable controls may enable an organization to always have updated information relating to the executable controls and how they impact their associated internal and/or external processes, thereby enabling the organization to, for example, provide such information to regulatory agencies, relevant stakeholders, and so forth.

FIG. 1 is a schematic diagram of a control execution management system 10 for managing the configuration and execution of executable controls 12 that are executed as part of processes 14 carried out by a particular organization (e.g., a company or other type of organization), as described in greater detail herein. In particular, as described in greater detail herein, users 16 associated with the particular organization (e.g., employees of a company, customers of a company, and so forth) may interact with processes 14 associated with the organization on a regular basis via one or more user computing devices 18, and the control execution management system 10 may enable executable controls 12 to be executed as part of the processes 14. In addition, as described in greater detail herein, executable controls 12 may be specifically configured (e.g., to provide certainly functionality for the processes 14, including rules for interacting with the processes 14, such as types of data that may be entered relating to the processes 14, specific tasks that may be performed using the processes 14, and so forth.

In certain situations, the organization may need to provide information relating to the configuration and execution of the executable controls 12 (e.g., to regulatory agencies, relevant stakeholders, and so forth). To that end, the control execution management system 10 may maintain information relating to the configuration and execution of executable controls 12 in a distributed ledger 20 (e.g., a blockchain network 20) by, for example, continuously monitoring changes to the executable controls 12 (e.g., that are made by certain users 16) and automatically storing data relating to the configuration and execution of the executable controls 12, as well as certain related internal and/or external data accessed from internal and external data sources 22, 24, in the distributed ledger 20. Continuously updating data relating to the configuration and execution of executable controls 12 enables the organization to have access to up-to-date, immutable information relating to the configurations and executions, which would otherwise not be possible.

For example, in situations where the organization is a service-oriented organization (e.g., insurance company, financial institution, and so forth), the processes 14 that may be continuously monitored by the control execution management system 10 may include, but are not limited to, processes 14 that define how the organization designs and provides services to their customers. Similarly, in situations where the organization is a product-oriented organization (e.g., manufacturing company, product distributing company, and so forth), the processes 14 that may be continuously monitored by the control execution management system 10 may include, but are not limited to, processes 14 that define how the organization designs, manufactures, and/or distributes products to their customers. In addition, the processes 14 that may be continuously monitored by the control execution management system 10 may include various internal projects (e.g., higher level management projects, such as overall organization management, research and development, and so forth) that facilitate these other processes 14.

The ability of the control execution management system 10 to continuously monitor changes of executable controls 12 and, further, to automatically store data relating to current configurations and/or executions of the executable controls 12 in an immutable manner (e.g., in a distributed ledger 20) enhances the security, reliability, repeatably, and so forth, of the executable controls 12 and, by extension, their associated processes 14. For example, certain processes 14 may expose an organization to certain risks. However, certain executable controls 12 associated with such processes 14 may be configured to minimize such risks, while still facilitating the functionality of the associated processes 14. As but one non-limiting example, if a loan application process 14 is intended to have a minimum loan amount (e.g., $5,000), an associated executable control 12 may be configured to prompt an alert when a user 16 tries to enter a loan amount of $500 (i.e., when a rule violation occurs) via the loan application process 14 (and, for example, a credit check has already been conducted, thereby incurring certain expenses), and may even stop the loan application process 14 from proceeding. As such, the executable control 12 described herein provide rules that at least partially govern the performance of certain functions performed by the processes 14 described herein.

As described in greater detail herein, in certain embodiments, the control execution management system 10 may continuously monitor for such executions of executable controls 12, and may automatically store data relating to the executions in the distributed ledger 20, such as the particular process 14 associated with the executable control 12 (e.g., the loan application process 14, in the current example), the user 16 that was using the particular process 14, which process parameters were affected (e.g., loan amount that was entered, in the current example), screenshot images that are captured during execution of the executable control 12 and the associated process 14 (e.g., as captured by a user computing device 18 executing the process 14), relevant snippets of code of the executable control 12 that were being executed at the time, and so forth. In certain embodiments, each of these type of data may be associated with timestamps 42 that enable the various types of data to be synchronized with each other for the purpose of recreating the specific events of a particular execution of a particular executable control 12, for example. Furthermore, in certain embodiments, the specific data that is stored in the distributed ledger 20 may be converted into certain data types and data protocols that facilitate both efficient storing of the data as well as streamlined data processing (e.g., by converting certain otherwise incomputable data types so that they can be more easily processed and analyzed, for example, by the control execution management software 82 described herein).

In addition, as also described in greater detail herein, in certain embodiments, the control execution management system 10 may continuously monitor for changes in modifications of executable controls 12, and may automatically data relating to the configurations and executions in the distributed ledger 20, such as processes 14 to which the particular executable control 12 is associated (e.g., the loan application process 14, in the current example), which process parameters may be involved during execution of the particular executable control 12 (e.g., loan amount, in the current example), and so forth. As such, the embodiments described herein are a melding of information technology and business aspects (e.g., financial, insurance, product design and/or production and/or distribution, service design and/or provision, as well as many other business aspects and combinations thereof).

In certain embodiments, the functionality of the control execution management system 10 described herein may be internally-facing (e.g., only accessible for users 16 directly associated with the particular organization, such as employees of the organization) as opposed to customer-facing (e.g., inaccessible to users 16 that are consumers of products and/or services provided by the organization). In certain embodiments, to enable this, the control execution management software 82 described herein may only be accesible via user computing devices 18 that are directly associated with (e.g., owned by) the particular organization, for example, as determined by certain security authorizations of the user computing devices 18 with respect to the communication network 72 described herein. In such embodiments, a primary function of the control execution management system 10 described herein may be to provide control of the processes 14 described herein and evidencing that, for example, enables the particular organization to provide information relating to configurations and/or executions of executable controls 12 associated with the processes 14 to, for example, regulatory agencies, relevant stakeholders, and so forth, to prove that the processes 14 and associated executable controls 12 are functioning properly.

As such, the embodiments described herein enable information relating to various processes 14, including the configuration and/or execution of executable controls 12 associated with the processes 14, may be automatically stored by the control execution management system 10 in a distributed ledger 20. Conventionally, this type of information is not stored centrally in such a manner. As described in greater detail herein, the control execution management system 10 may monitor any number of processes 14 that are utilized by a particular organization, such as consumer loans, credit cards, letters sent to customers, and any other conceivable processes 14.

In addition, as described in greater detail herein, the control execution management system 10 may utilize artificial intelligence (AI) bots 26 to initiate execution of certain processes 14 and associated executable controls 12 (e.g., acting as dummy users to test the executable controls 12 using, for example, test scripts) and/or to capture data relating to configurations and/or executions of executable controls 12 in substantially real time, and may communicate with the control execution management system 10 to enable the control execution management system 10 to store such data in a distributed ledger 20. In addition, in certain embodiments, the control execution management system 10 may be configured to log the difference between data that is triggered by an AI bot 26 versus data that is triggered by a real user 16. In addition, in certain embodiments, the control execution management system 10 (and the AI bots 26, in certain embodiments) may function as an execution layer (e.g., as plug-in software) that any and all software applications interacting with the processes 14 (and, by extension, their associated executable controls 12) may utilize to enable the control execution management system 10 to capture data control events. Indeed, in certain embodiments, the control execution management system 10 (and the AI bots 26, in certain embodiments) may be deployed as a cloud-based control execution management network to facilitate decentralized management of the executable controls 12 and the processes 14 described herein.

Figure 2:
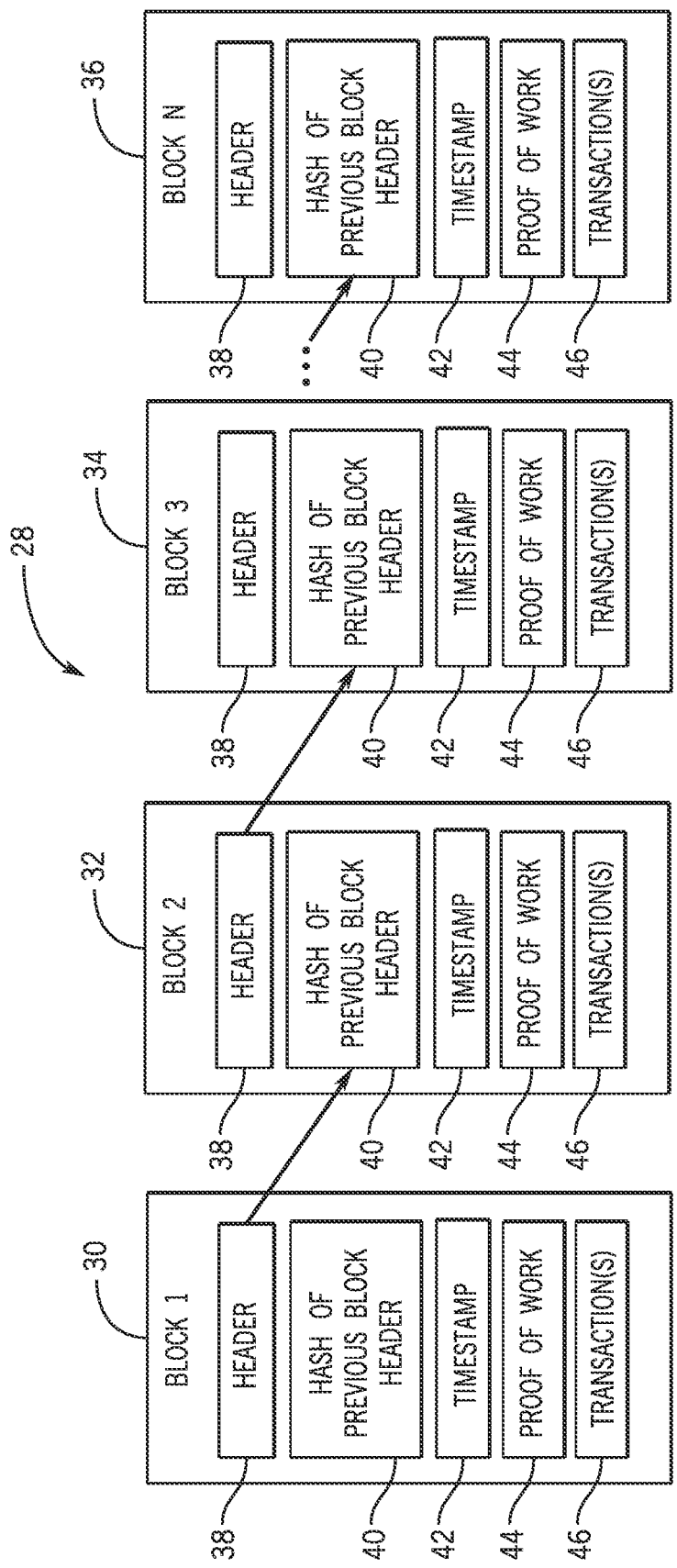
FIG. 2 illustrates a block diagram of a blockchain of a blockchain network of FIG. 1, in accordance with embodiments described herein.

FIG. 2 illustrates a block diagram of a blockchain 28 of the blockchain network 20 of FIG. 1. In the illustrated embodiment, the blockchain 28 is illustrated as having multiple blocks 30, 32, 34, and 36. The block 30 (first block in the blockchain 28) may have been created and allocated as a special starting block. The block 30 may include a unique header 38 uniquely identifying the block 30 from other blocks in the blockchain 28. Because the block 30 is the first block in the blockchain 28, a hash of a previous block header 38 may be set to zero. A timestamp 42 may include the date of creation for the block 30, and a proof of work section 44 may include certain "work" that proves that a "miner" has performed work suitable for the creation of the block 30 and/or to verify transactions in the blockchain 28. The work section 44 may vary based on a protocol used to create the blockchain 28. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified blockchain 28, and so on, down the tree. In other words, there is no way to create a fake value that would hash to an expected Merkle tree value (e.g., value stored in work section 44 of the block 30), thus creating a single value that proves the integrity of all of the transactions under it. Transactions, such as transactions relating to interaction with the executable controls 12 and/or the processes 14 described herein, may be stored in a transactions section 46. Data related to the particular transaction may also be stored in section 46 (or in another section).

When a new block is created, the block will receive a new header 38 uniquely identifying the new block. As described in greater detail herein, a peer-to-peer network may include multiple "miners" that add blocks to the blockchain 28 based on the blockchain protocol. In general, multiple miners validate transactions 46 that are to be added to a block, and compete (e.g., perform computing work, as introduced above) to have their respective block added to the blockchain 28. Validation of transactions includes verifying digital signatures associated with respective transactions 46. For a block to be added to the blockchain 28, a miner must demonstrate a proof of work before their proposed block of transactions is accepted by the peer-to-peer network, and before the block is added to the blockchain 28. In certain embodiments, a blockchain protocol include a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 40) in the blockchain 28, details of the transaction(s) 46 that are to be included in the to-be-created block, and a "nonce" value (e.g., a random number used only once).

Multiple nodes may compete to hash a set of transactions, and to provide the next block that is to be added to the blockchain 28. In certain embodiments, the blockchain protocol may provide a threshold hash to qualify a block to be added to the blockchain 28. For example, the threshold hash may include a predefined number of zeros (0s) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the blockchain 28. Each miner provides the reference to the previous (most recent) block in the blockchain 28, details of the transaction(s) 46 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the blockchain 28. Consequently, the respective miner's block is broadcast across the peer-to-peer network. At this point, all other miners cease work (because one miner was already successful), and all copies of the blockchain 28 are updated across the peer-to-peer network to append the block to the blockchain 28. Each miner may produce hundreds of thousands (or more) of hash values, before any one miner provides a qualifying hash value (e.g., at least the first four characters of the hash value are each zero).

It is to be noted that any computing device may be miners. Accordingly, for example, as new data is created, new blocks may be added to the blockchain 28, including blocks 30, 32, 34, and 36. Indeed, the blockchain 28 may continue to grow, storing new data as it becomes available. Because of the distributed nature of the peer-to-peer network created via the blockchain network 20, each node may include copies of the blockchain 28 and share copies of the blockchain 28 as new peers enter the peer-to-peer network. Each copy of the blockchain 28 may include verified information for all or substantially all of the data tracked by the blockchain network 20. The information is secure, immutable, and more efficiently tracked as new added gets added via the blockchain network 20.

Figure 3:
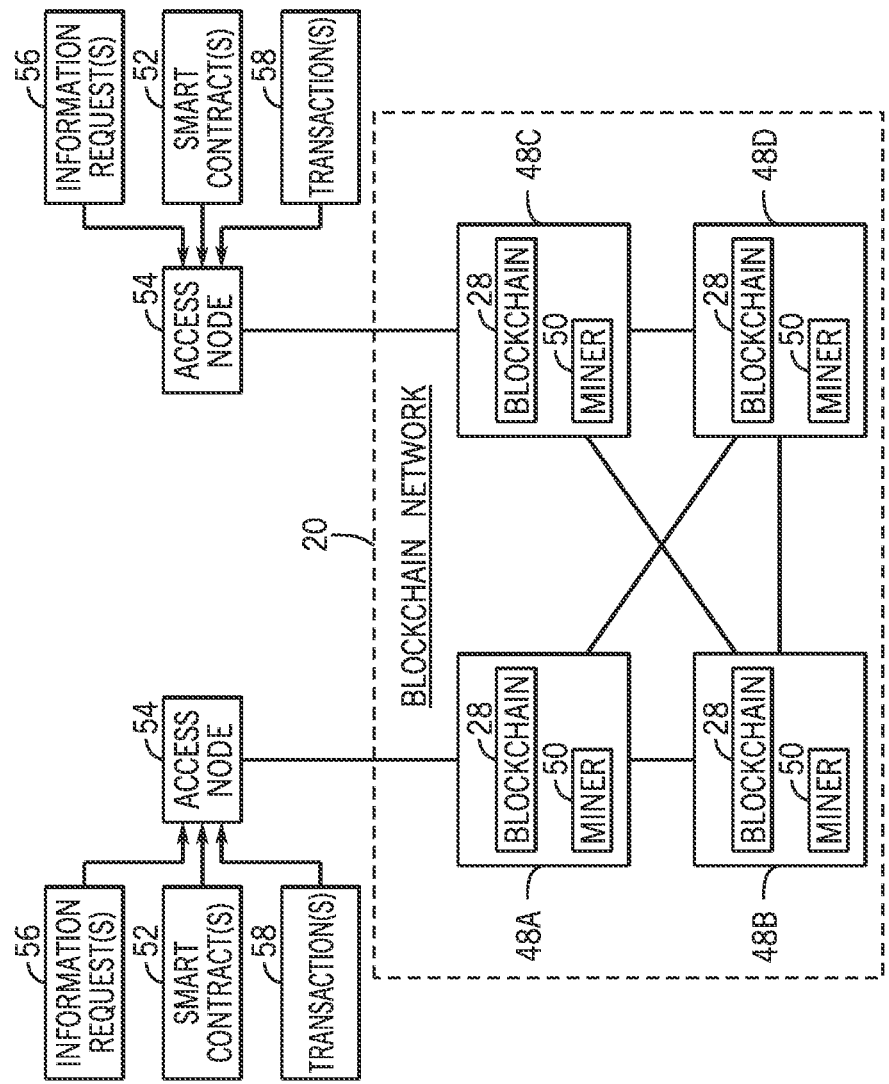
FIG. 3 illustrates how the blockchain network of FIG. 1 of FIG. 1 may interact with data processing components to enable the configuration and execution management of the executable controls, in accordance with embodiments described herein.

FIG. 3 illustrates how the blockchain network 20 of FIG. 1 may interact with data processing components to enable the configuration and execution management of the executable controls 12 described herein. As described herein, the blockchain network 20 may be formed by several blockchain nodes, such as blockchain nodes 48A, 48B, 48C, and 48D, which may be implemented by a dedicated server or computer device, or may be implemented as a virtual machine in a shared computer system. Each blockchain node 48A-D may have in its memory a replicate of the blockchain 28. Each blockchain node 48A-D may also have a miner 50, an application that may verify the integrity of the blockchain 28, and may also perform operations and/or transactions using smart contracts 52 associated with the blockchain 28. As described herein, the blockchain 28 is a replicated data structure that may have its consistency and integrity preserved by a consensus mechanism performed by the miners 50.

Users may interact with the blockchain network 20 via an access node 54. For example, users may request, through the access node 54, the recordation and/or processing of data (e.g., using a smart contract 52), such as an information request 56 (e.g., a request for the state of a smart contract 52), or a transaction request 58 (e.g., a request for a change in a state of the smart contract 52) to the blockchain 28. The smart contracts 52, information requests 56, and/or transaction requests 58 allow users to record certain data relating to interaction with the executable controls 12 and/or the processes 14 described herein. Each access node 54 may be implemented by a computer terminal coupled to the blockchain network 20.

A miner 50 from any of the blockchain nodes 48A, 48B, 48C, and 48D may create an update to the blockchain 28. In certain embodiments, the smart contract(s) 52 may be a data structure that may include states (e.g., internal states) and transaction instructions relating to the data stored in the blockchain 28. The transactions, or functions, may include instructions that modify the states of the smart contracts 52 and/or interact with other smart contracts 52 by performing further transactions. Examples of smart contracts 52 described herein include smart contracts 52 related to storing data relating to interaction with the executable controls 12 and/or the processes 14 described herein. Following insertion of a smart contract 52, the blockchain node 48 may propagate its update of the blockchain 28, and the other blockchain nodes 48 may accept the update using a consensus mechanism (e.g., proof of work, proof of stake, and so forth). For example, if blockchain node 48A generated a blockchain segment that incorporates some smart contract 52 to the blockchain 28, blockchain node 48A may propagate the updated blockchain 28 to blockchain nodes 48B, 48C, and 48D, which may validate and accept the updated blockchain 28.

Similarly, a transaction request 58 may be received by any miner 50 of the blockchain nodes 48A, 48B, 48C, and 48D via an access node 54. The transaction request 58 may perform operations that cause a change in the state of a smart contract 52 recorded in the blockchain 28. After performing the desired operations, and changing the state of the smart contract 52, in accordance with the transaction request 58, the miner 50 may update the blockchain 28 to record the updated state of the smart contract 52. The updated state of the smart contract 52 may be propagated to the blockchain nodes 48A-D, verified, and persisted using consensus mechanisms. An information request 56, similar to a transaction request 58, may be received by a miner 50, and may perform operations associated with a smart contract 52. However, in contrast with the transaction request 58, the information request 56 does not lead to changes in the state of the smart contract 52 and, thus, updates to the blockchain 28 that result from a successful information request 56 are not performed.

In certain embodiments, performance of the operations by the miners 50 of the blockchain nodes 48 may be incentivized and/or regulated by exchange of tokens (e.g., currencies) of the blockchain 28. For example, in public blockchains, updates to the blockchain 28 by a blockchain node 48A-D may be rewarded with a blockchain token. Moreover, performance of a transaction request 58 or an information request 56 may be rewarded with a blockchain token. For example, in certain embodiments, in the Ethereum public blockchain, updates to the blockchain from recordation of smart contracts 52 and information requests 56 may be rewarded with Ether tokens, and performance of transaction requests 58 and information requests 56 may be incentivized by offers of Ethers in the form of a secondary token called "gas". In certain private blockchain embodiments, tokens may be used to implement prioritization mechanisms for the operations and/or to prevent large or faulty operations from blocking the blockchain 28 with arbitrarily long operation times.

As described in greater detail herein, certain users 16 (e.g., employees of a company) may configure various executable controls 12 associated with processes 14 using user computing devices 18, and data that is generated relating to the configuration and execution of executable controls 12 associated with these processes 14 may be automatically stored in the distributed ledger 20 (e.g., blockchain network) by the control execution management system 10, as described in greater detail herein. In particular, the control execution management system 10 may monitor certain user computing devices 18 associated with the organization to automatically detect when changes to configurations of certain executable controls 12 occur, and then to automatically store data relating to these changes in the distributed ledger 20, as described in greater detail herein. As also described in greater detail herein, data stored in internal data sources 22, as well as data gathered from external data sources 24, may be used by the various processes 14 being monitored and, when determined by the control execution management system 10 to be relevant to a particular executable control 12, information relating to such data may also be automatically stored in the distributed ledger 20 by the control execution management system 10.

Figure 4:
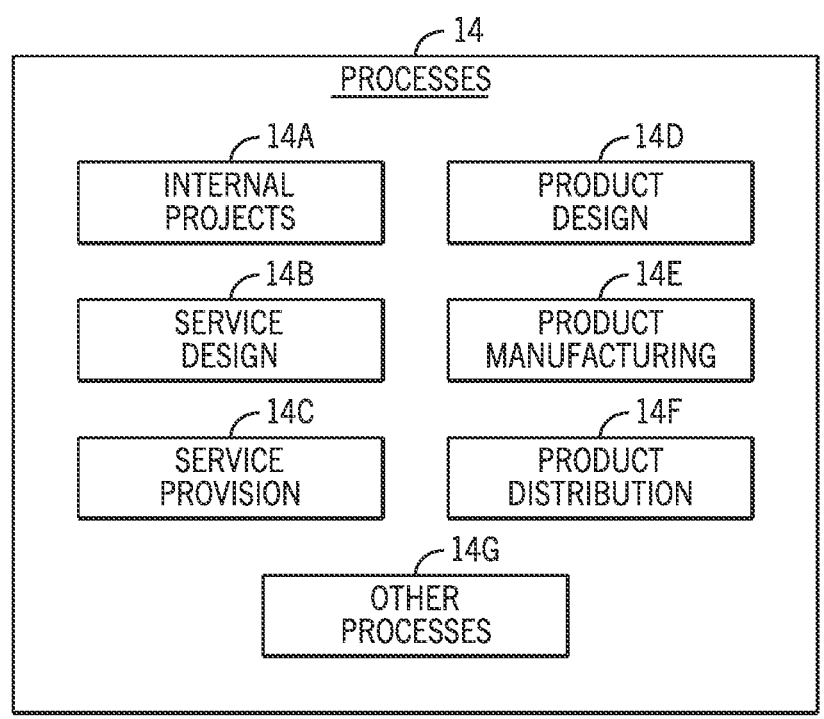
FIG. 4 illustrates various types of processes that may include configurable executable controls, in accordance with embodiments described herein.

FIG. 4 illustrates various processes 14 that may include executable controls 12, as described in greater detail herein. For example, as illustrated in FIG. 4, in certain embodiments, the processes 14 include any and all types of processes 14 that may be configured by users 16 of the organization, such as internal projects 14A (e.g., higher level management projects, such as overall organization management, research and development, and so forth) that may be conducted between users 16 of the organization to facilitate other processes 14, service design processes 14B relating to the design of services that may be provided by the organization, service provision processes 14C relating to the provision of the services designed by the service design processes 14B, product design processes 14D relating to the design of products that may be produced by the organization, product manufacturing processes 14E relating to the manufacture of the products designed by the product design processes 14D, product distribution processes 14F relating to the distribution of the products manufactured by the product manufacturing processes 14E to their customers, and other types of processes 14. In addition, many other types of processes 14G may be configured by users 16.

Figure 5:
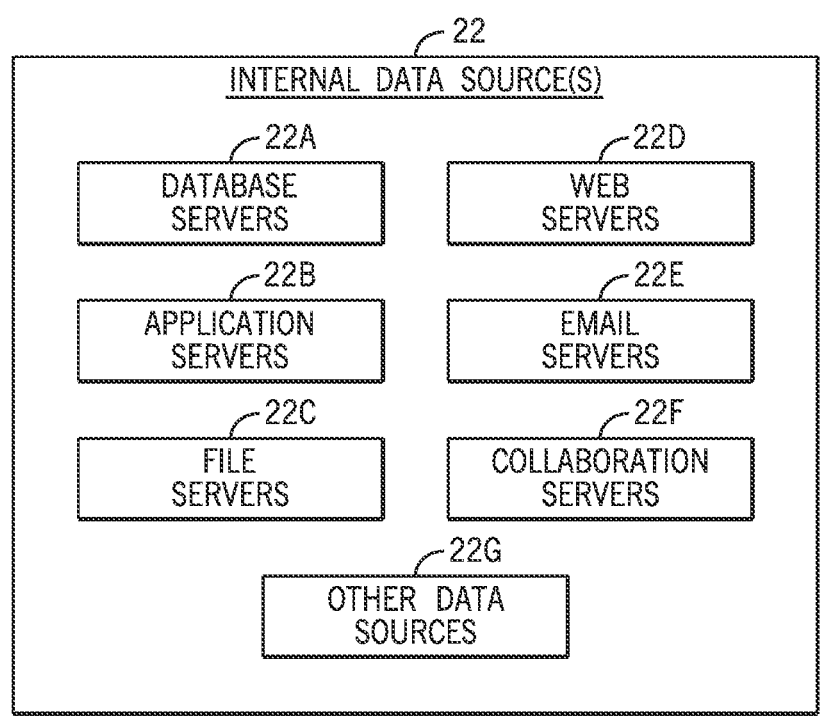
FIG. 5 illustrates various types of internal data sources that may be used by processes having executable controls, in accordance with embodiments described herein.
Figure 6:
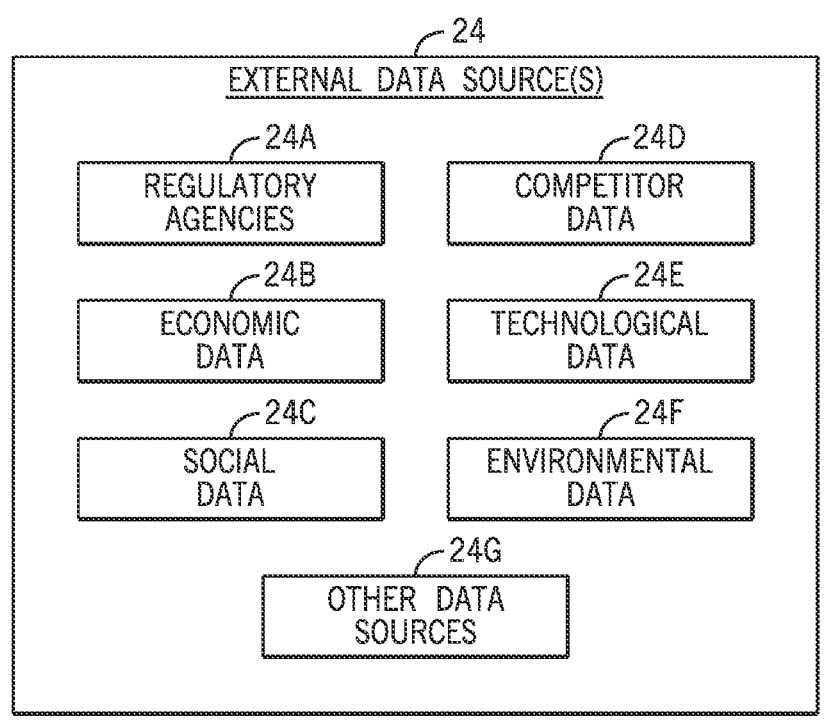
FIG. 6 illustrates various types of external data sources that may be used by processes having executable controls, in accordance with embodiments described herein.

In general, the various processes 14 that include executable controls 12 may utilize data stored in internal data sources 22 as well as external data sources 24. For example, as illustrated in FIG. 5, in certain embodiments, the internal data sources 22 include any and all types of data sources that are internal to the particular organization, such as database servers 22A, application servers 22B, file servers 22C, web servers 22D, email servers 22E, collaboration servers 22F, and other types of internal data sources 22G. In addition, as illustrated in FIG. 6, in certain embodiments, the external data sources 24 include any and all types of data sources that are external to the particular organization, such as regulatory agency data sources 24A (e.g., parameters of particular regulations implemented by regulatory agencies), economic data sources 24B (e.g., product component price data, labor cost data, financial market data, currency exchange data, socioeconomic data, and so forth), social data sources 24C (e.g., trends in preferences of particular social groups as determined from social media, sales data, survey data, and so forth), competitor data sources 24D (e.g., publicly available data relating to competitors, such as sales data, financial data, news, and so forth), technological data sources 24E (e.g., parameters relating to technological advancements, constraints, and so forth), environmental data sources 24F (e.g., weather, recycling options, trends in environmental protection, and so forth), and other types of external data sources 24G.

Returning now to FIG. 1, the user computing devices 18 may include processing circuitry such as one or more processors 60 configured to execute instructions 62 stored in memory media 64 of the respective user computing device 18, wherein the instructions 62, when executed by the one or more processors 60, enable the respective user computing device 18 to input data relating to one or more processes 14 of the organization using, for example, one or more displays 66 and one or more inputs devices 68 (e.g., mice, keyboards, touchscreens, cameras, and so forth).

In certain embodiments, the one or more processors 60 of the user computing devices 18 may be any suitable type of computer processors or microprocessors capable of executing computer-executable code. In certain embodiments, the memory media 64 of the user computing devices 18 may be any suitable articles of manufacture that can serve as media to store processor-executable code, data, or the like. These articles of manufacture may represent computer-readable media (e.g., any suitable form of memory or storage) that may store processor-executable code (e.g., the instructions 62) executed by the one or more processors 60 to perform the presently disclosed techniques. In certain embodiments, the memory media 64 of the user computing devices 18 may represent tangible, non-transitory computer-readable media (e.g., any suitable form of memory or storage) that may store the processor-executable code used by the one or more processors 60 to perform various techniques described herein. It should be noted that non-transitory merely indicates that the media is tangible and not a signal. It should be noted that the components described above with regard to the user computing devices 18 are exemplary components, and the user computing devices 18 may include additional or fewer components in certain embodiments.

In addition, in certain embodiments, the user computing devices 18 may also include communication circuitry 70 configured to facilitate communication between the respective user computing device 18 and other computing devices including, but not limited to other user computing devices 18 associated with other users 16 of the organization, the control execution management system 10, and so forth, as well as internal and external data sources 22, 24 and various AI bots 26, in certain circumstances. In particular, in certain embodiments, the communication circuitry 70 may facilitate communications using Wi-Fi, near field communication, Bluetooth, Zigbee, radio frequency identification (RFID) tags and/or readers, an embedded wireless module, and/or another suitable wired or wireless communication network 72.

As described in greater detail herein, the control execution management system 10 may be used to continuously monitor modifications to executable controls 12 that are executed as part of processes 14 performed by a particular organization, and to store data relating to such modifications in a distributed ledger 20. In certain embodiments, the control execution management system 10 may include communication circuitry 74 configured to facilitate communication between the control execution management system 10 and other computing devices including, but not limited to the user computing devices 18, and so forth, as well as internal and external data sources 22, 24 and the various AI bots 26. In certain embodiments, the communication circuitry 74 may facilitate communications using Wi-Fi, near field communication, Bluetooth, Zigbee, radio frequency identification (RFID) tags and/or readers, an embedded wireless module, and/or another suitable wired or wireless communication network 72.

In certain embodiments, the control execution management system 10 may include other processing circuitry such as one or more processors 76 configured to execute instructions 78 stored in memory media 80 of the control execution management system 10, wherein the instructions 78, when executed by the one or more processors 76, enable control execution management software 82 to perform the functions described in greater detail herein including, but not limited to, continuously monitoring for changes in the configuration and/or execution of executable controls 12 executed as part of processes 14, and automatically storing data relating to such configuration modifications in a distributed ledger 20. In certain embodiments, the one or more processors 76 of the control execution management system 10 may be any suitable type of computer processors or microprocessors capable of executing computer-executable code. In certain embodiments, the memory media 64 of the control execution management system 10 may be any suitable articles of manufacture that can serve as media to store processor-executable code, data, or the like. These articles of manufacture may represent computer-readable media (e.g., any suitable form of memory or storage) that may store processor-executable code (e.g., the instructions 78) executed by the one or more processors 76 to perform the presently disclosed techniques. In certain embodiments, the memory media 80 of the control execution management system 10 may represent tangible, non-transitory computer-readable media (e.g., any suitable form of memory or storage) that may store the processor-executable code used by the one or more processors 76 to perform various techniques described herein. It should be noted that non-transitory merely indicates that the media is tangible and not a signal. It should be noted that the components described above with regard to the control execution management system 10 are exemplary components, and the control execution management system 10 may include additional or fewer components in certain embodiments.

In addition, in certain embodiments, the control execution management system 10, as well as the various AI bots 26, may be deployed as a cloud-based control execution management network to facilitate decentralized management of the executable controls 12 of the processes 14 described herein, which may be continuously available to users 16 of the organization. For example, as described in greater detail herein, the AI bots 26 may be configured to periodically interrogate user computing devices 18 and/or processes 14 that are being performed (or configured) by the user computing devices 18 to: (1) detect configuration modifications to executable controls 12 that are executable by the processes 14, (2) detect data relating to actual execution of the executable controls 12 to determine how the executable controls 12 function in actual practice, and (3) automatically communicate data relating to the configuration modifications and/or the actual executions to the control execution management system 10 so that the control execution management system 10 may analyze the data and determine when to automatically store data relating to the configuration modifications and/or the actual executions in the distributed ledger 20.

Figure 7:
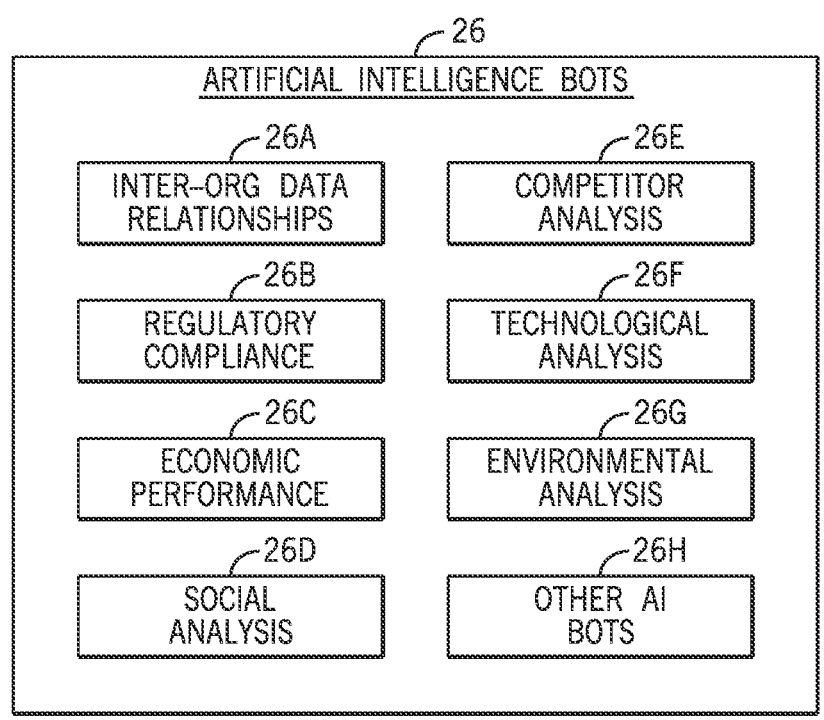
FIG. 7 illustrates various types of analysis focuses of AI bots, in accordance with embodiments described herein.

In certain embodiments, the AI bots 26 may each be trained to have a specific analysis focus when analyzing data relating to configurations and executions of executable controls 12 associated with the various processes 14. For example, as illustrated in FIG. 7, in certain embodiments, the AI bots 26 may include AI bots 26A focused on inter-organizational data relationships (e.g., to ensure that data used by executable controls 12 in multiple processes 14 within the organization are consistent), AI bots 26B focused on compliance with various regulatory agencies (e.g., to ensure that configurations and executions of executable controls 12 associated with certain processes 14 comply with current regulations implemented by the regulatory agencies, and so forth), AI bots 26C focused on economic performance of the organization (e.g., to maximize potential income of the organization, to minimize potential costs incurred by the organization, and so forth), AI bots 26D focused on analysis of social data (e.g., to guide configurations and executions of executable controls 12 associated with certain processes 14 toward recent social trends, and so forth), AI bots 26E focused on analysis of customer data (e.g., to guide configurations and executions of executable controls 12 associated with certain processes 14 to ensure that the organization is keeping up with other competing organizations, and so forth), AI bots 26F focused on analysis of technological data (e.g., to guide configurations and executions of executable controls 12 associated with certain processes 14 based on recent advancements in technology, current constraints of technology, and so forth), AI bots 26G focused on analysis of environmental data (e.g., to guide configurations and executions of executable controls 12 associated with certain processes 14 to ensure that the organization takes certain environmental issues into account, and so forth), and other types of AI bots 26H.

As described in greater detail herein, the control execution management system 10 may be used to train the various AI bots 26 to have their specific analysis focuses for the purpose of enabling the AI bots 26 to automatically analyze configurations and executions of executable controls 12 associated with certain processes 14 such that data relating to the executable controls 12 may be stored by the control execution management system 10 in the distributed ledger 20. For example, AI bots 26A focused on inter-organizational data relationships may periodically cross-check any and all combinations of internal processes 14 of the organization to ensure that all of the parameters that are common between the internal processes 14 are consistent. As but one non-limiting example, different departments of a company may each have internal processes 14 that use substantially similar data, perform substantially similar functions, affect the same parties, and so forth. In such scenarios, an AI bot 26A focused on inter-organizational data relationships may analyze such internal processes 14 to ensure that the data, the functionality, and so forth, of the internal processes 14 are consistent. In certain embodiments, the control execution management system 10 may train the AI bot 26A how to access data common between various internal processes 14, how to determine when the accessed data is relevant to other internal processes 14, and so forth, and further to determine when executable controls 12 accessing and/or using such data are configured and/or executing in a manner deemed acceptable for the organization, as determined by the control execution management system 10.

In addition, AI bots 26B focused on compliance with various regulatory agencies may periodically access regulatory data (e.g., parameters of particular regulations implemented by regulatory agencies) from regulatory agency data sources 24A, and may analyze processes 14 of the organization to ensure that all of the processes 14 of the organization comply with the regulatory data. As but one non-limiting example, if a particular regulation mandates that companies may not ask for (or, perhaps, even access) certain types of data relating to their customers in certain contexts, an AI bot 26B focused on regulatory compliance may ensure that none of the processes 14 of the organization use such types of data in a non-compliant manner. In certain embodiments, the control execution management system 10 may train the AI bot 26B how to access regulatory data from regulatory agency data sources 24A, how to determine when the accessed regulatory data is relevant to particular processes 14, and so forth, and further to determine when executable controls 12 accessing and/or using such data are configured and/or executing in a manner deemed acceptable for the organization, as determined by the control execution management system 10.

In addition, AI bots 26C focused on economic performance of the organization may periodically access economic data (e.g., product component price data, labor cost data, financial market data, currency exchange data, socioeconomic data, and so forth) from economic data sources 24B, and may analyze processes 14 of the organization to maximize potential income of the organization, to minimize potential costs incurred by the organization, and so forth, based on the economic data. As but one non-limiting example, if the price of certain product components rise significantly, an AI bot 26C focused on economic performance of the organization may, for example, determine products manufactured by the organization include these product components, and may suggest modifications to manufacturing schedules for these products. In certain embodiments, the control execution management system 10 may train the AI bot 26C how to access economic data from economic data sources 24B, how to determine when the accessed economic data is relevant to particular processes 14, and so forth, and further to determine when executable controls 12 accessing and/or using such data are configured and/or executing in a manner deemed acceptable for the organization, as determined by the control execution management system 10.

In addition, AI bots 26D focused on analysis of social data may periodically access social data (e.g., trends in preferences of particular social groups as determined from social media, sales data, survey data, and so forth) from social data sources 24C, and may analyze processes 14 of the organization to guide the processes 14 toward recent social trends, and so forth. As but one non-limiting example, if social data suggests that potential customers are talking about certain services provided by and/or products manufactured by the organization, an AI bot 26D focused on analysis of social data may suggest that these services and/or products should be prioritized within the organization by, for example, increasing marketing for these services and/or products. In certain embodiments, the control execution management system 10 may train the AI bot 26D how to access social data from social data sources 24C, how to determine when the accessed social data is relevant to particular processes 14, and so forth, and further to determine when executable controls 12 accessing and/or using such data are configured and/or executing in a manner deemed acceptable for the organization, as determined by the control execution management system 10.

In addition, AI bots 26E focused on analysis of competitor data may periodically access competitor data (e.g., publicly available data relating to competitors, such as sales data, financial data, news, and so forth) from competitor data sources 24D, and may analyze processes 14 of the organization to guide the processes 14 to ensure that the organization is keeping up with other competing organizations, and so forth. As but one non-limiting example, if competitor data suggests that competitor companies are increasing production of certain product types, an AI bot 26E focused on analysis of competitor data may suggest that the organization consider also increasing production of similar product types. In certain embodiments, the control execution management system 10 may train the AI bot 26E how to access competitor data from competitor data sources 24D, how to determine when the accessed competitor data is relevant to particular processes 14, and so forth, and further to determine when executable controls 12 accessing and/or using such data are configured and/or executing in a manner deemed acceptable for the organization, as determined by the control execution management system 10.

In addition, AI bots 26F focused on analysis of technological data may periodically access technological data (e.g., parameters relating to technological advancements, constraints, and so forth) from technological data sources 24E, and may analyze processes 14 of the organization to guide the processes 14 based on recent advancements in technology, current constraints of technology, and so forth. As but one non-limiting example, if technological data suggests that recent advancements in particular types of software may enable the organization to more effectively and/or more timely provide certain services, an AI bot 26F focused on analysis of technological data may suggest that the organization consider implementing such software. In certain embodiments, the control execution management system 10 may train the AI bot 26F how to access technological data from technological data sources 24E, how to determine when the accessed technological data is relevant to particular processes 14, and so forth, and further to determine when executable controls 12 accessing and/or using such data are configured and/or executing in a manner deemed acceptable for the organization, as determined by the control execution management system 10.

In addition, AI bots 26G focused on analysis of environmental data may periodically access environmental data (e.g., weather, recycling options, trends in environmental protection, and so forth) from environmental data sources 24F, and may analyze processes 14 of the organization to guide the processes 14 to ensure that the organization takes certain environmental issues into account, and so forth. As but one non-limiting example, if environmental data suggests that certain types of recycling are being used more often and/or more efficiently, an AI bot 26G focused on analysis of environmental data may suggest that the organization consider utilizing such recycling more often. In certain embodiments, the control execution management system 10 may train the AI bot 26G how to access environmental data from environmental data sources 24F, how to determine when the accessed environmental data is relevant to particular processes 14, and so forth, and further to determine when executable controls 12 accessing and/or using such data are configured and/or executing in a manner deemed acceptable for the organization, as determined by the control execution management system 10.

The other types of AI bots 26H may similarly be trained by the control execution management system 10. In addition to performing their own specifically-focused analysis of data in the internal and external data sources 22, 24, the AI bots 26 described herein may be configured to communicate with each other such that potential modifications to the executable controls 12 suggested by one AI bot 26 may be reviewed by another AI bot 26 before the potential modifications are presented to users 16 of the organization. Indeed, in certain embodiments, the control execution management system 10 may train the AI bots 26 when it is appropriate to communicate with certain other types of AI bots 26.

Figure 8:
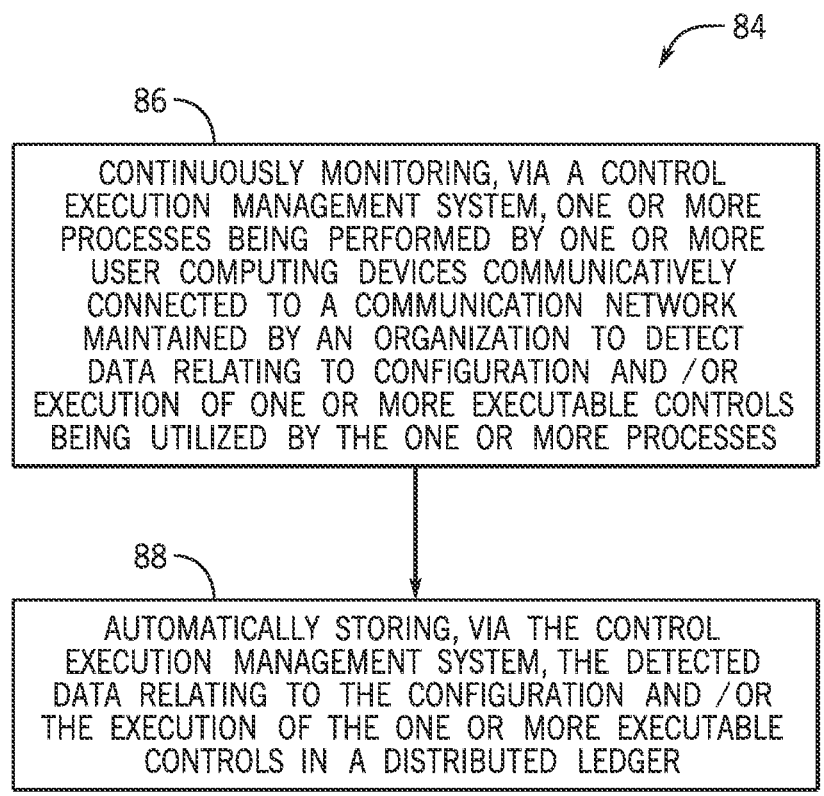
FIG. 8 is a flow diagram of a method of using a control execution management system, in accordance with embodiments described herein.

FIG. 8 is a flow diagram of a method 84 of using the control execution management system 10 (and the AI bots 26, in certain embodiments). In certain embodiments, the method 84 includes continuously monitoring, via the control execution management system 10, one or more processes 14 being performed by one or more user computing devices 18 communicatively connected to a communication network 72 maintained by an organization to detect data relating to configuration and/or execution of one or more executable controls 12 being utilized by the one or more processes 14 (block 86). As described in greater detail herein, the one or more executable controls 12 are configured to provide one or more rules for performance of one or more functions of the one or more processes 14. In addition, in certain embodiments, the method 84 also includes automatically storing, via the control execution management system 10, the detected data relating to the configuration and/or the execution of the one or more executable controls 12 in a distributed ledger 20 (block 88).

In certain embodiments, the detected data relating to the configuration and/or the execution of the one or more executable controls 12 includes data relating to a change in the configuration of the one or more executable controls 12 that is implemented via the one or more user computing devices 18. In addition, in certain embodiments, the detected data relating to the configuration and/or the execution of the one or more executable controls 12 includes data relating to the execution of the one or more executable controls 12 that is performed by the one or more processes 14 via the one or more user computing devices 18. In such embodiments, the method 84 may also include determining, via the control execution management system 10, if the detected data relating to the execution of the one or more executable controls 12 indicates that performance of the one or more functions of the one or more processes 14 violates the one or more rules provided by the one or more executable controls 12; and automatically storing, via the control execution management system 10, the detected data relating to the execution of the one or more executable controls 12 in the distributed ledger 20 in response to a determination that the performance of the one or more functions of the one or more processes 14 violates the one or more rules provided by the one or more executable controls 12.

In addition, in certain embodiments, the method 84 may include deploying one or more AI bots 26 of the control execution management system 10 onto the communication network 72; continuously monitoring, via the one or more AI bots 26, the one or more processes 14 being performed by the one or more user computing devices 18 communicatively connected to the communication network 72 to detect the data relating to the configuration and/or the execution of the one or more executable controls 12 being utilized by the one or more processes 14; and automatically communicating, via the one or more AI bots 26, the detected data relating to the configuration and/or the execution of the one or more executable controls 12 to one or more computing devices of the control execution management system 10. In such embodiments, the method 84 may include performing, via the one or more AI bots 26, the one or more processes 14 to detect test data relating to execution of the one or more executable controls 12 being utilized by the one or more processes 14. In addition, in such embodiments, the method 84 may include training, via the one or more computing devices of the control execution management system 10, each AI bot 26 of the one or more AI bots 26 based on a respective analysis focus of the respective AI bot 26.

In addition, in certain embodiments, the method 84 may include utilizing the one or more executable controls 12 during performance of a plurality of processes 14 being performed by a plurality of user computing devices 18 communicatively connected to the communication network 72. In addition, in certain embodiments, the distributed ledger 20 includes a blockchain network. In addition, in certain embodiments, a control execution management network (i.e., comprised of the control execution management system 10 and one or more AI bots 26, in certain embodiments) is inaccessible to user computing devices 18 not directly associated with the organization, thereby enhancing security of the data managed by the control execution management network.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A control execution management network, comprising:
one or more computing devices comprising one or more processors configured to execute instructions stored in memory of the one or more computing devices, wherein the instructions, when executed by the one or more processors, are configured to cause the one or more computing devices to:
continuously monitor one or more processes being performed by one or more user computing devices communicatively connected to a communication network maintained by an organization to detect data relating to configuration and/or execution of one or more executable controls being utilized by the one or more processes, wherein the detected data relating to the configuration and/or the execution of the one or more executable controls comprises data relating to the execution of the one or more executable controls that is performed by the one or more processes via the one or more user computing devices, and wherein the one or more executable controls are configured to provide one or more rules for performance of one or more functions of the one or more processes;
determine if the detected data relating to the execution of the one or more executable controls indicates that performance of the one or more functions of the one or more processes violates the one or more rules provided by the one or more executable controls; and
automatically store the detected data relating to the configuration and/or the execution of the one or more executable controls in a distributed ledger in response to a determination that the performance of the one or more functions of the one or more processes violates the one or more rules provided by the one or more executable controls.

2. The control execution management network of claim 1, wherein the detected data relating to the configuration and/or the execution of the one or more executable controls comprises data relating to a change in the configuration of the one or more executable controls that is implemented via the one or more user computing devices.

3. The control execution management network of claim 1, comprising one or more artificial intelligence (AI) bots configured to:
continuously monitor the one or more processes being performed by the one or more user computing devices communicatively connected to the communication network to detect the data relating to the configuration and/or the execution of the one or more executable controls being utilized by the one or more processes; and
automatically communicate the detected data relating to the configuration and/or the execution of the one or more executable controls to the one or more computing devices.

4. The control execution management network of claim 3, wherein the one or more AI bots are configured to initiate performance of the one or more processes to detect test data relating to execution of the one or more executable controls being utilized by the one or more processes.

5. The control execution management network of claim 3, wherein the one or more computing devices are configured to train each AI bot of the one or more AI bots based on a respective analysis focus of the respective AI bot.

6. The control execution management network of claim 1, wherein the one or more executable controls are configured to be utilized by a plurality of processes being performed by a plurality of user computing devices communicatively connected to the communication network.

7. The control execution management network of claim 1, wherein the distributed ledger comprises a blockchain network.

8. The control execution management network of claim 1, wherein the control execution management network is inaccessible to user computing devices not directly associated with the organization.

9. A method, comprising:
deploying one or more artificial intelligence (AI) bots of a control execution management system onto a communication network maintained by an organization;
continuously monitoring, via the one or more AI bots of the control execution management system, one or more processes being performed by one or more user computing devices communicatively connected to the communication network to detect data relating to configuration and/or execution of one or more executable controls being utilized by the one or more processes, wherein the one or more executable controls are configured to provide one or more rules for performance of one or more functions of the one or more processes;
automatically communicating, via the one or more AI bots, the detected data relating to the configuration and/or the execution of the one or more executable controls to one or more computing devices of the control execution management system; and
automatically storing, via the control execution management system, the detected data relating to the configuration and/or the execution of the one or more executable controls in a distributed ledger.

10. The method of claim 9, wherein the detected data relating to the configuration and/or the execution of the one or more executable controls comprises data relating to a change in the configuration of the one or more executable controls that is implemented via the one or more user computing devices.

11. The method of claim 9, wherein the detected data relating to the configuration and/or the execution of the one or more executable controls comprises data relating to the execution of the one or more executable controls that is performed by the one or more processes via the one or more user computing devices.

12. The method of claim 11, comprising:
determining, via the control execution management system, if the detected data relating to the execution of the one or more executable controls indicates that performance of the one or more functions of the one or more processes violates the one or more rules provided by the one or more executable controls; and
automatically storing, via the control execution management system, the detected data relating to the execution of the one or more executable controls in the distributed ledger in response to a determination that the performance of the one or more functions of the one or more processes violates the one or more rules provided by the one or more executable controls.

13. The method of claim 9, comprising initiating, via the one or more AI bots, performance of the one or more processes to detect test data relating to execution of the one or more executable controls being utilized by the one or more processes.

14. The method of claim 9, comprising training, via the one or more computing devices of the control execution management system, each AI bot of the one or more AI bots based on a respective analysis focus of the respective AI bot.

15. The method of claim 9, comprising utilizing the one or more executable controls during performance of a plurality of processes being performed by a plurality of user computing devices communicatively connected to the communication network.

16. The method of claim 9, wherein the distributed ledger comprises a blockchain network.

17. A control execution management network, comprising:
one or more user computing devices communicatively connected to a communication network maintained by an organization, wherein each computing device of the one or more user computing devices comprises one or more processors configured to execute instructions stored in memory of the respective computing device; and
one or more artificial intelligence (AI) bots configured to:
continuously monitor one or more processes being performed by the one or more user computing devices to detect data relating to configuration and/or execution of one or more executable controls being utilized by the one or more processes, wherein the one or more executable controls are configured to provide one or more rules for performance of one or more functions of the one or more processes; and
automatically communicate the detected data relating to the configuration and/or the execution of the one or more executable controls to one or more computing devices, and to instruct the one or more computing devices to store the detected data relating to the configuration and/or the execution of the one or more executable controls in a distributed ledger.

18. The control execution management network of claim 17, wherein the one or more AI bots are configured to initiate performance of the one or more processes to detect test data relating to execution of the one or more executable controls being utilized by the one or more processes.

19. The control execution management network of claim 17, wherein the one or more computing devices are configured to train each AI bot of the one or more AI bots based on a respective analysis focus of the respective AI bot.

* * * * *